US012579753B2

(12) United States Patent
Pathiraja et al.

(10) Patent No.: US 12,579,753 B2
(45) Date of Patent: Mar. 17, 2026

(54) PHASED CAPTURE ASSESSMENT AND FEEDBACK FOR MOBILE DIMENSIONING

(71) Applicant: ZEBRA TECHNOLOGIES CORPORATION, Lincolnshire, IL (US)

(72) Inventors: Rochana Pathiraja, Dampelessa (LK); Raveen T. Thrimawithana, Pannipitiya (LK); Sanduni Karunatilaka, Kottawa (LK)

(73) Assignee: Zebra Technologies Corporation, Lincolnshire, IL (US)

( * ) Notice: Subject to any disclaimer, the term of this patent is extended or adjusted under 35 U.S.C. 154(b) by 224 days.

(21) Appl. No.: 18/227,616

(22) Filed: Jul. 28, 2023

(65) Prior Publication Data

US 2024/0054730 A1      Feb. 15, 2024

Related U.S. Application Data

(60) Provisional application No. 63/398,099, filed on Aug. 15, 2022.

(51) Int. Cl.
| | |
|---|---|
| *G06T 19/00* | (2011.01) |
| *G06F 3/14* | (2006.01) |
| *G06T 7/70* | (2017.01) |
| *G06V 10/60* | (2022.01) |
| *G06V 10/74* | (2022.01) |

(52) U.S. Cl.
CPC ............... *G06T 19/00* (2013.01); *G06F 3/14* (2013.01); *G06T 7/70* (2017.01); *G06V 10/60* (2022.01); *G06V 10/761* (2022.01); *G06T 2219/012* (2013.01)

(58) Field of Classification Search
CPC .............. G06T 7/70; G06T 19/00; G06F 3/14
See application file for complete search history.

(56) References Cited

U.S. PATENT DOCUMENTS

| | | | |
|---|---|---|---|
| 2016/0321827 A1* | 11/2016 | Xiao ...................... | G06V 20/10 |
| 2020/0404177 A1 | 12/2020 | Sapienza et al. | |
| 2021/0279967 A1 | 9/2021 | Gernoth et al. | |
| 2022/0084279 A1 | 3/2022 | Lindmeier et al. | |
| 2023/0239574 A1* | 7/2023 | Dzitsiuk .............. | H04N 23/959 |
| | | | 348/207.99 |

OTHER PUBLICATIONS

International Search Report and Written Opinion for International Application No. PCT/US2023/30195 mailed on Nov. 7, 2023.

* cited by examiner

*Primary Examiner* — Matthew Salvucci

(57) ABSTRACT

A method in a computing device includes: capturing, via a depth sensor having a field of view, (i) a point cloud depicting an object resting on a support surface, and (ii) a two-dimensional image depicting the object and the support surface; based on the point cloud, detecting a portion of the object; determining, based on the portion of the object, whether a position of the object within the field of view meets a positional criterion; when the position of the object within the field of view does not meet the positional criterion, generating a positional feedback instruction; and controlling a display to present the positional feedback instruction.

14 Claims, 7 Drawing Sheets

300

600

604

108

104

612

608

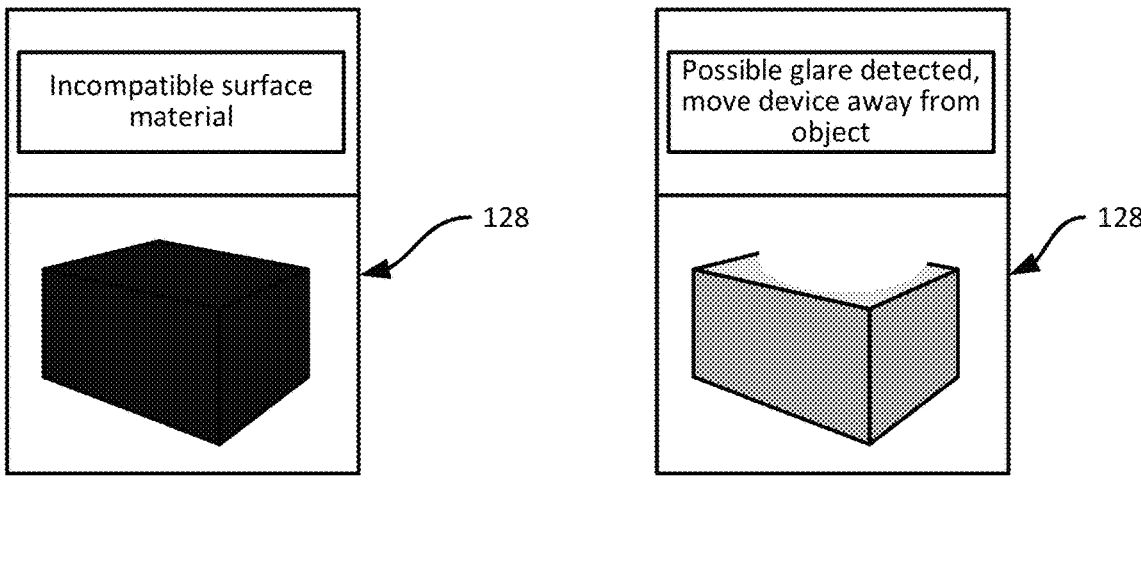
FIG. 7A                               FIG. 7B
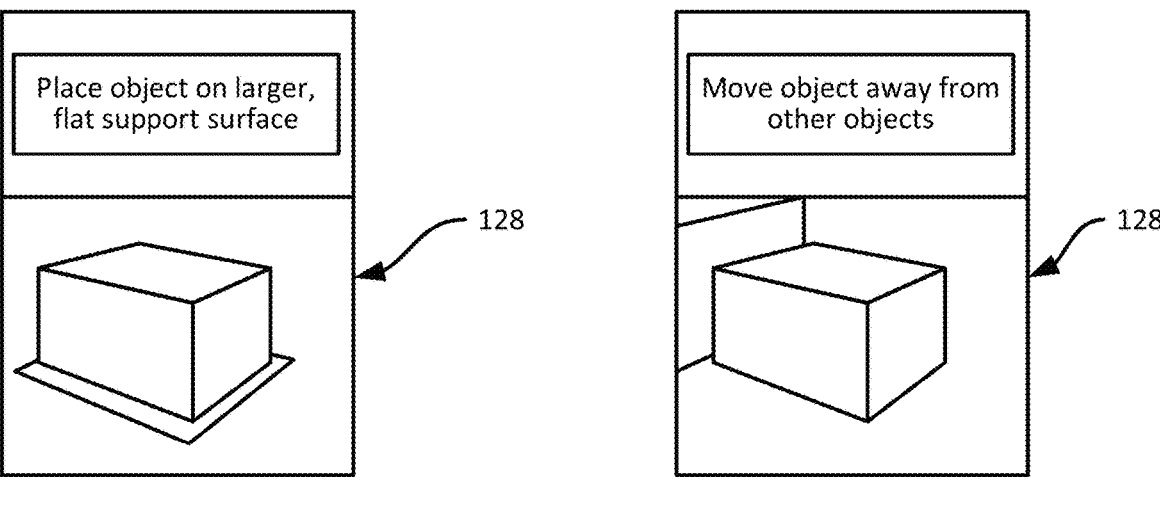
FIG. 7C                               FIG. 7D

PHASED CAPTURE ASSESSMENT AND FEEDBACK FOR MOBILE DIMENSIONING

CROSS-REFERENCE TO RELATED APPLICATIONS

This application claims priority from U.S. provisional application No. 63/398,099, filed Aug. 15, 2022, the contents of which is incorporated herein by reference.

BACKGROUND

Depth sensors such as time-of-flight (ToF) sensors can be deployed in mobile devices such as handheld computers, and employed to capture point clouds of objects (e.g., boxes or other packages), from which object dimensions can be derived. Point clouds generated by ToF sensors, however, may incompletely capture surfaces of the objects, and/or include artifacts caused by multipath reflections received at the sensor.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 7A, 7B, 7C, and 7D are diagrams illustrating example performances of block 350 of the method of FIG. 3.

Figure 1:
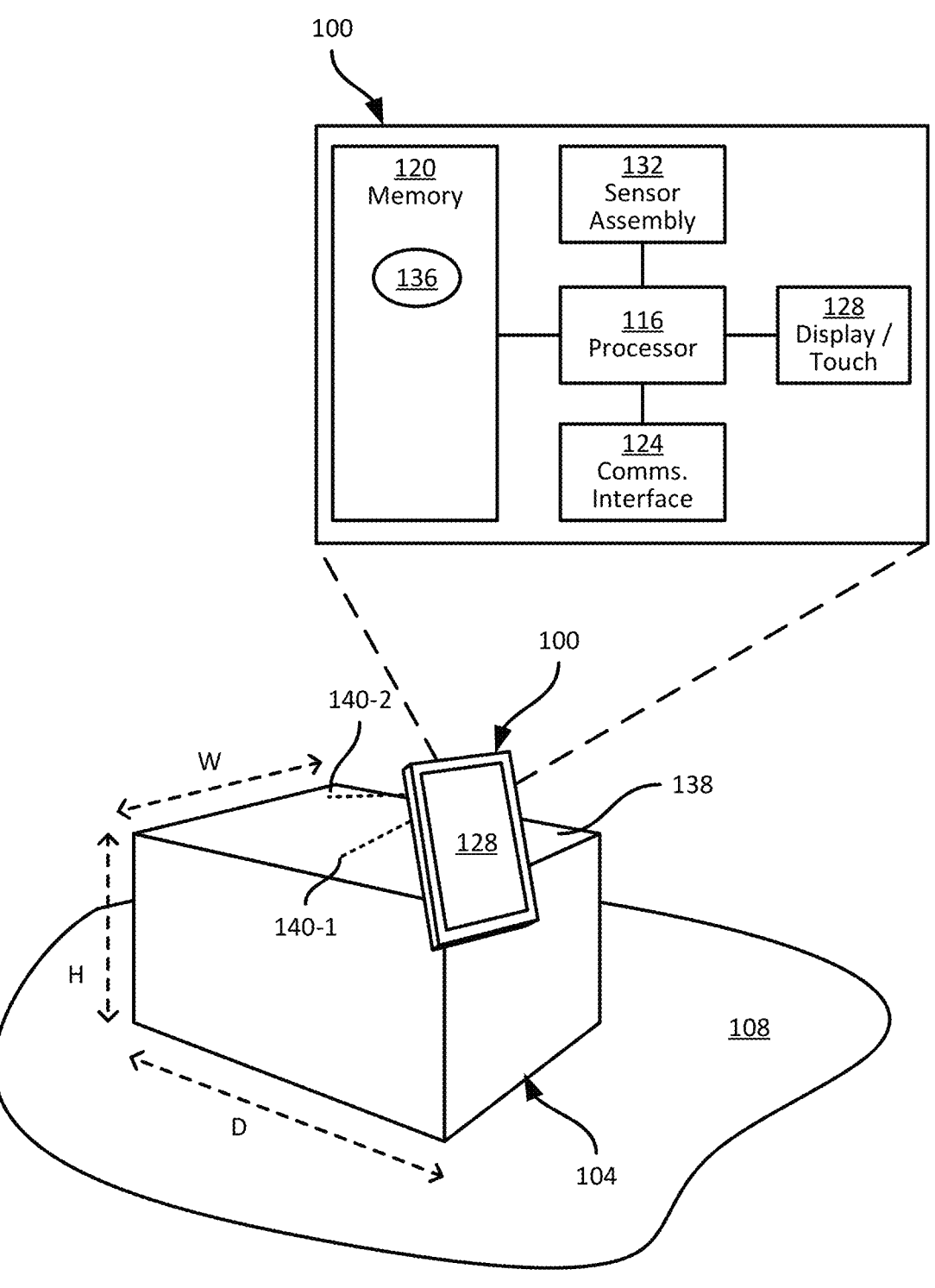
FIG. 1 is a diagram of a computing device for dimensioning an object.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a computing device including: capturing, via a depth sensor having a field of view, (i) a point cloud depicting an object resting on a support surface, and (ii) a two-dimensional image depicting the object and the support surface; based on the point cloud, detecting a portion of the object; determining, based on the portion of the object, whether a position of the object within the field of view meets a positional criterion; when the position of the object within the field of view does not meet the positional criterion, generating a positional feedback instruction; and controlling a display to present the positional feedback instruction.

Additional examples disclosed herein are directed to a computing device including: a depth sensor; and a processor configured to: capture, via a depth sensor having a field of view, (i) a point cloud depicting an object resting on a support surface, and (ii) a two-dimensional image depicting the object and the support surface; based on the point cloud, detect a portion of the object; determine, based on the portion of the object, whether a position of the object within the field of view meets a positional criterion; when the position of the object within the field of view does not meet the positional criterion, generate a positional feedback instruction; and control a display to present the positional feedback instruction.

FIG. 1 illustrates a computing device 100 configured to capture sensor data depicting a target object 104 within a field of view (FOV) of a sensor of the device 100. The computing device 100, in the illustrated example, is a mobile computing device such as a tablet computer, smartphone, or the like. The computing device 100 can be manipulated by an operator thereof to place the target object 104 within the FOV of the sensor, in order to capture sensor data for subsequent processing as described below. In other examples, the computing device 100 can be implemented as a fixed computing device, e.g., mounted adjacent to an area in which target objects 104 are placed and/or transported (e.g., a staging area, a conveyor belt, a storage container, or the like).

The target object 104, in this example, is a parcel (e.g., a cardboard box or other substantially cuboid object), although a wide variety of other target objects can also be processed as set out below. The sensor data captured by the computing device 100 includes a point cloud. More specifically, the sensor captures a plurality of depth measurements, each corresponding to a pixel of the sensor. The depth measurements and sensor pixel coordinates can then be transformed, e.g., based on calibration parameters for the sensor, into a plurality of points, each with three-dimensional coordinates according to a predetermined coordinate system. The point cloud therefore defines three-dimensional positions of corresponding points on the target object 104, a support surface 108 supporting the object 104, and/or any other objects in the FOV.

The sensor data captured by the computing device 100 also includes a two-dimensional image depicting the target object 104. The image can include a two-dimensional array of pixels, each pixel containing a color and/or brightness value. For instance, the image can be an infrared or near-infrared image, in which each pixel in the array contains a brightness or intensity value. From the captured sensor data, the device 100 (or in some examples, another computing device such as a server, configured to obtain the sensor data from the device 100) is configured to determine dimensions of the target object 104, such as a width "W", a depth "D", and a height "H" of the target object 104.

The target object 104 is, in the examples discussed below, a substantially rectangular prism. As shown in FIG. 1, the height H of the object 104 is a dimension substantially perpendicular to the support surface (e.g., a floor) 108 on which the object 104 rests. The width W and depth D of the object 104, in this example, are substantially orthogonal to one another and to the height H. The dimensions determined from the captured data can be employed in a wide variety of downstream processes, such as optimizing loading arrangements for storage containers, pricing for transportation services based on parcel size, and the like.

Certain internal components of the device 100 are also shown in FIG. 1. For example, the device 100 includes a processor 116 (e.g., a central processing unit (CPU), graphics processing unit (GPU), and/or other suitable control circuitry, microcontroller, or the like). The processor 116 is interconnected with a non-transitory computer readable storage medium, such as a memory 120. The memory 120 includes a combination of volatile memory (e.g. Random Access Memory or RAM) and non-volatile memory (e.g. read only memory or ROM, Electrically Erasable Programmable Read Only Memory or EEPROM, flash memory). The memory 120 can store computer-readable instructions, execution of which by the processor 116 configures the processor 116 to perform various functions in conjunction with certain other components of the device 100. The device 100 can also include a communications interface 124 enabling the device 100 to exchange data with other computing devices, e.g. via various networks, short-range communications links, and the like.

The device 100 can also include one or more input and output devices, such as a display 128, e.g., with an integrated touch screen. In other examples, the input/output devices can include any suitable combination of microphones, speakers, keypads, data capture triggers, or the like.

The device 100 further includes a sensor assembly 132 (also referred to herein as a sensor 132), controllable by the processor 116 to capture point cloud and image data. The sensor assembly 132 can include a sensor capable of capturing both depth data (that is, three-dimensional measurements) and image data (that is, two-dimensional measurements). For example, the sensor 132 can include a time-of-flight (ToF) sensor. The sensor 132 can be mounted on a housing of the device 100, for example on a back of the housing (opposite the display 128, as shown in FIG. 1) and having an optical axis that is substantially perpendicular to the display 128.

A ToF sensor can include, for example, a laser emitter configured to illuminate a scene and an image sensor configured to capture reflected light from such illumination. The ToF sensor can further include a controller configured to determine a depth measurement for each captured reflection according to the time difference between illumination pulses and reflections. The depth measurement indicates the distance between the sensor 132 itself and the point in space where the reflection originated. Each depth measurement represents a point in a resulting point cloud. The sensor 132 and/or the processor 116 can be configured to convert the depth measurements into points in a three-dimensional coordinate system.

The sensor 132 can also be configured to capture ambient light. For example, certain ToF sensors employ infrared laser emitters alongside infrared-sensitive image sensors. Such a ToF sensor is therefore capable of both generating a point cloud based on reflected light emitted by the laser emitter, and an image corresponding to reflected light from the emitter, and optionally reflected ambient light. The capture of ambient light can enable the ToF sensor to produce an image with a greater resolution than the point cloud, albeit without associated depth measurements. In other examples, the resolution of the IR image may match that of the point cloud. However, the intensity data from the IR image may still enable the device 100 to detect various conditions that are difficult to detect from the point cloud alone. In other words, although the point cloud may include inaccurately positioned points, or may have missing points, the two-dimensional IR image may include accurate intensity data for those points. The sensor 132 and/or the processor 116 can map points in the point cloud to pixels in the image, and three-dimensional positions for at least some pixels can therefore be determined from the point cloud.

In other examples, the sensor assembly 132 can include various other sensing hardware, such as a ToF sensor and an independent color camera. In further examples, the sensor assembly 132 can include a depth sensor other than a ToF sensor, such as a stereo camera, or the like.

The memory 120 stores computer readable instructions for execution by the processor 116. In particular, the memory 120 stores a dimensioning application 136 which, when executed by the processor 116, configures the processor 116 to process point cloud data captured via the sensor assembly 132 to detect the object 104 and determine dimensions (e.g., the width, depth, and height shown in FIG. 1) of the object 104. In further examples, the application 136 can be implemented by one or more specially designed hardware and firmware components, such as FPGAs, ASICs and the like.

For example, the dimensioning process implemented by the application 136 can include identifying an upper surface 138 of the object 104, and the support surface 108, in the point cloud. The height H of the object 104 can be determined as the perpendicular distance between the upper surface 138 and the support surface 108. The width W and the depth D can be determined as the dimensions of the upper surface 138.

Detection of the object 104 and dimensioning of the object 104 based the captured point cloud can be affected by a wide variety of factors. For example, the positioning of the object 104 within the FOV of the sensor 132 can impede successful detection of the object, e.g., by preventing the processor 116 from detecting the full perimeter of the upper surface 138. In the absence of a complete view of the object 104, the processor 116 may be unable to determine dimensions for the object. In other examples, if the sensor 132 is placed too close to the object 104, the object 104 may not be fully contained within the field of view, and/or may be subject to excessive reflected light (e.g., glare) that reduces the accuracy of depth measurements. More generally, the position of the object 104 within the field of view of the sensor 132 can affect the performance of the dimensioning process.

Further, even when the object 104 is positioned appropriately within the field of view (e.g., substantially centered in the field of view, fully encompassed within the field of view, and occupying at least a predetermined portion of the field of view, e.g., more than half), various other conditions can impede successful dimensioning. For example, some surface materials (e.g., dark-colored materials, bubble wrap, and the like) on the object 104 may absorb light emitted by a ToF sensor and produce few reflections, or produce numerous interfering reflections. Further, surfaces of the object 104 that are at small angles relative to the optical axis of the sensor 132, and that are relatively distant from the sensor 132, may produce fewer reflections detectable by the sensor 132. For example, in FIG. 1, although the object 104 may be centered in the field of view of the sensor 132 and occupy about 80% of the field of view, some points are less likely to produce detectable reflections. For example, a point 140-1 on an upper surface of the object 104 may be closer to perpendicular to the optical axis, as well as closer to the sensor 132, and therefore more likely to generate reflections detectable by the sensor 132. Conversely, a point 140-2 may lie further from the sensor 132 and at a smaller angle relative to the optical axis of the sensor 132. The point 140-2 may therefore be less likely to be represented in a point cloud captured by the sensor 132.

Figure 2:
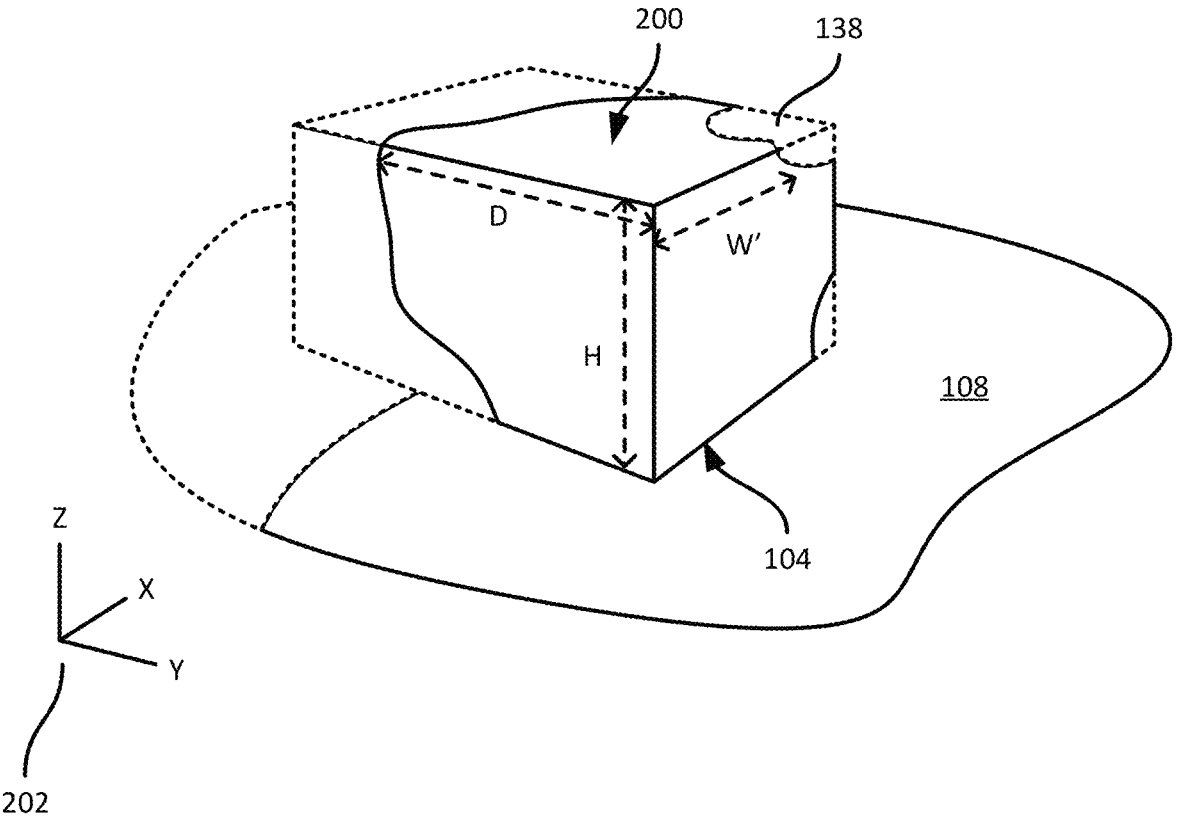
FIG. 2 is a diagram of an example point cloud captured by the device of FIG. 1.

Factors such as those mentioned above can lead to reduced point cloud density corresponding to some regions of the object 104, and/or other artifacts in a captured point cloud. Turning to FIG. 2, an example point cloud 200 is illustrated, as captured by the sensor 132. The portions of the object 104 and the support surface 108 shown in solid lines are represented in the point cloud 200, e.g., as points in a coordinate system 202, while the portions of the object 104 and the support surface 108 shown in dashed lines are not represented in the point cloud 200. That is, certain portions of the object 104 are not depicted in the point cloud 200 due to the artifacts mentioned above. The example shown in FIG. 2 is exaggerated for illustration, and it will be understood that in practice the point cloud 200 may include points in the regions illustrated as being empty, although the number and/or accuracy of those points may be suboptimal.

As will be understood from FIG. 2, it may be possible to derive the height H of the object 104 from the point cloud 200, but the width W and the depth D may not be accurately derivable. For example, from the point cloud 200 a width W' and a depth D' may be determined, based on the incomplete representation of the upper surface 138 in the point cloud 200. The width W' and the depth D', as will be apparent from FIGS. 1 and 2, do not accurately reflect the true width W and depth D of the object 104.

The above obstacles to accurate dimensioning can impose limitations of various dimensioning applications, e.g., necessitating sensor data capture from a constrained top-down position rather than the more flexible isometric position shown in FIG. 1 (in which three faces of the object 104 are presented to the sensor 132). Further limitations can include restrictions on dimensioning larger objects, dark-colored objects, and the like. In some examples, multiple captures may be required to accurately obtain dimensions for the object 104, thus consuming more time for dimensioning than a single capture.

The device 100 is configured, as discussed below, to detect various conditions, including at least some of those noted above, and to generation feedback instructions to an operator of the device 100. The detection of conditions that negatively affect dimensioning, and the generation of feedback, may improve the dimensioning performance of the device 100 by reducing the time required to capture point cloud and/or image data that results in successful dimensioning. The device 100 is configured to assess two classes of conditions. As discussed below, the device 100 is first configured to assess a position (but not necessarily an orientation) of the object 104 within the field of view of the sensor 132. Second, when the position is acceptable, the device 100 is configured to assess various other conditions, such as material properties and the like.

Figure 3:
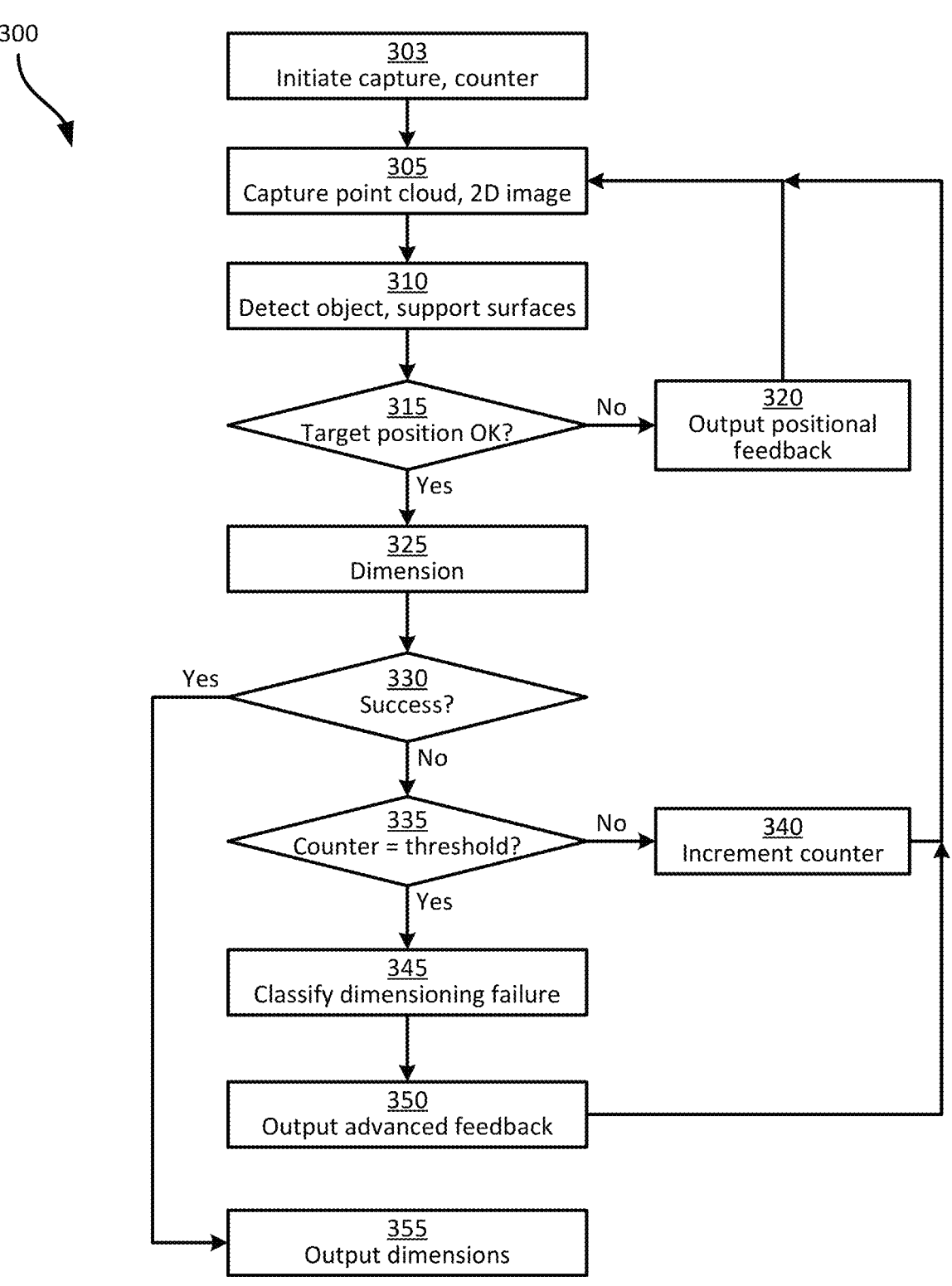
FIG. 3 is a flowchart of a method of phased capture assessment and feedback for mobile dimensioning.

Turning to FIG. 3, a method 300 of phased capture assessment and feedback for mobile dimensioning is illustrated. The method 300 is described below in conjunction with its performance by the device 100, e.g., to dimension the object 104. It will be understood from the discussion below that the method 300 can also be performed by a wide variety of other computing devices including or connected with sensor assemblies functionally similar to the sensor assembly 132.

At block 303, the device is configured to initiate data capture, which may also be referred to as a dimensioning session. For example, upon activation of a dimensioning function (e.g., via an input such as a trigger pull, selection of an element rendered on the display 128, etc.), the device 100 can be configured to begin capturing a continuous stream of depth and 2D image via successive performances of block 305, with each capture being processed as discussed below. The device 100 can also initialize a counter at block 303. As discussed further below, the counter can be employed to begin a second phase of data capture assessment and feedback, in the event that dimensioning fails for a predetermined number of performances of block 305 after completion of a first phase.

At block 305, the device 100 is configured, e.g., via control of the sensor 132 by the processor 116, to capture a point cloud depicting at least a portion of the object 104, and a two-dimensional image depicting at least the portion of the object 104. The image is captured substantially simultaneously with the point cloud, e.g., by the same sensor 132 in the case of a ToF sensor assembly, and/or by an independent color or greyscale camera that is synchronized with the depth sensor. The device 100 can, for example, be positioned relative to the object 104 as shown in FIG. 1, to capture a point cloud and image depicting the object 104. Successful dimensioning of the object involves capturing a point cloud that contains the entire object 104 (that is, with no portion of the object 104 falling outside the field of view of the sensor 132), among other conditions. The point cloud and image captured at block 305, however, may not fully contain the object 104 in some cases.

The capture of point cloud data at block 305 can include capturing a depth image (e.g., a set of pixels, at least some having distance values from the sensor 132 derived from time-of-flight measurements), and converting the depth image to a point cloud. Under certain conditions, generation of the point cloud from the depth image may fail. For example, point cloud generation may fail if configuration parameters of the sensor 132 are missing, incorrect, or the like. In such cases, the device 100 can generate a notification, e.g., on the display 128, instructing an operator of the device 100 to update the configuration settings of the sensor 132.

At block 310 the device 100 is configured to detect the support surface 108 and at least one surface of the object 104, from the point cloud captured at block 305. In the present example, the device 100 is configured to detect the upper surface 138 and the support surface 108, as a complete detection of the upper surface 138 permits dimensioning of the object 104. Detection of surfaces in the captured point cloud can be performed via a suitable plane-fitting algorithm, such as random sample consensus (RANSAC), or the like. The support surface 108 can be distinguished from other surfaces during such detection by, for example, selecting the detected surface with the lowest height (e.g., the lowest Z value in the coordinate system 202). The upper surface 138 can be distinguished from other surfaces during detection by, for example, selecting a surface substantially parallel to the support surface 108. In other examples, the device 100 can track its current orientation relative to gravity, e.g., via an inertial measurement unit (IMU) or the like, and distinguish the upper surface 138 from other surfaces in the point cloud by selecting a substantially horizontal surface. The device 100 can also be configured to detect other surfaces, such as any visible sides of the object 104 between the upper surface 138 and the support surface 108.

Figures 4A, 4B:
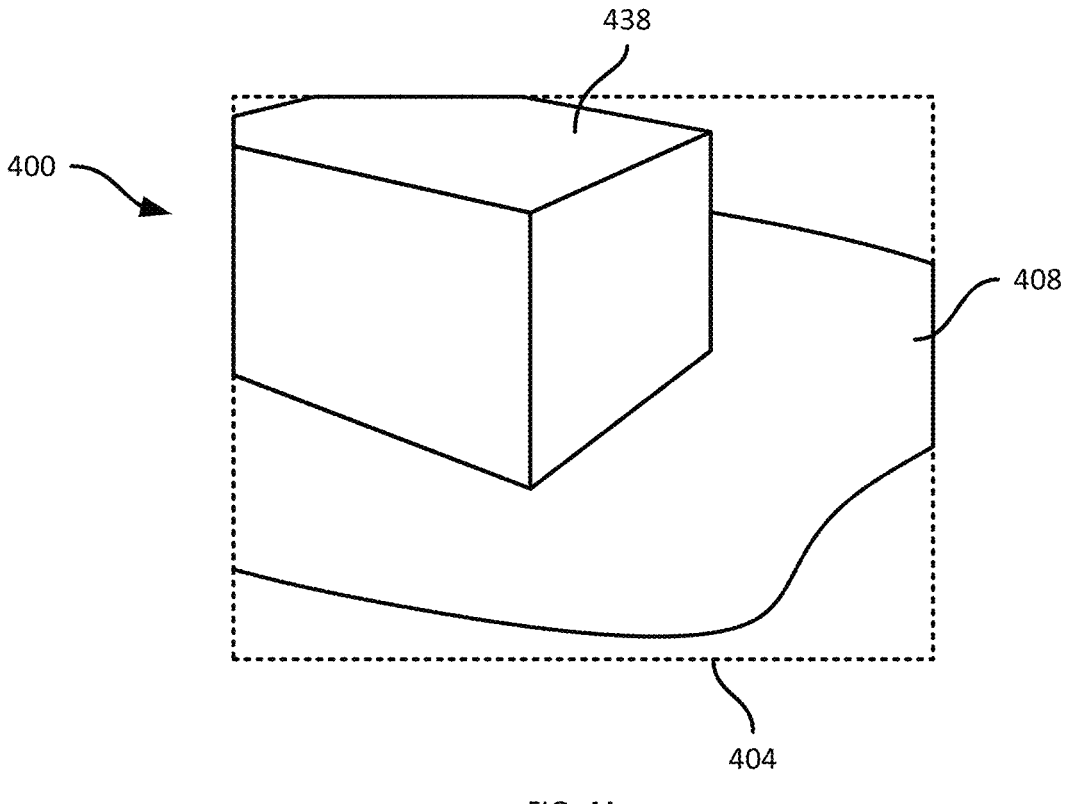
FIG. 4A is a diagram of a further example point cloud captured by the device of FIG. 1.
FIG. 4B is a diagram illustrating an example performance of block 320 of the method of FIG. 3.

Turning to FIG. 4A, an example point cloud 400 captured at block 305 is illustrated. At block 310, the device 100 detects an upper surface candidate 438, and a support surface candidate 408. As will be understood from a comparison of the actual object 104 and support surface 108 in FIG. 1 with the point cloud 400 in FIG. 4A, the point cloud 400 depicts only a portion of the upper surface 138. That is, the upper surface candidate 438, while corresponding to the upper surface 138, is incomplete. The incomplete representation of the object 104 may result, for example, in a field of view 404 of the sensor 132 being incorrectly positioned relative to the object 104.

Referring again to FIG. 3, at block 315 the device 100 is configured to determine whether the portion(s) of the object 104 detected at block 310 meet at least one positional criterion. Block 315 represents the first phase of data capture assessment and feedback generation. In the present example, the portions of the object 104 include the upper surface candidate 438. In general, via the performance of block 315, the device 100 determines whether the physical location of the object 104 relative to the sensor 132 is acceptable for dimensioning. The determination at block 315 can therefore include determining whether the entire object 104 is contained within the field of view 404, and/or whether the object 104 is too close to the sensor 132, and/or whether the object 104 is too far from the sensor 132.

For example, the device 100 can be configured to determine (based on the point cloud) a distance from the sensor 132 to the object 104, e.g., to the closest point of the detected portion of the object 104 (the candidate upper surface 438 in this example). The device 100 can maintain, e.g., as configuration data for the application 136, a predetermined lower threshold representing a minimum distance between the sensor 132 and the object 104 for successful dimensioning, and/or a predetermined upper threshold representing a maximum distance between the sensor 132 and the object 104 for successful dimensioning. For example, the lower threshold can be about 40 cm, and the upper threshold can be about 200 cm.

The device 100 can then be configured to determine whether the distance between the object 104 and the sensor 132 exceeds the lower threshold, or falls below the upper threshold. When either determination is negative, indicating that the object 104 is either too close to the sensor 132 or too far from the sensor 132, the determination at block 315 is negative.

The device 100 can further determine whether the object 104 (e.g., the candidate upper surface 438) occupies at least a predetermined portion of the field of view of the sensor 132 (e.g., more than half, although a wide variety of other predetermined portions are contemplated). When the object 104 occupies a smaller portion of the field of view than the predetermined portion, the object 104 may be considered too far away, and the determination at block 315 may be negative.

The device 100 can also determine, at block 315, whether the detected portion of the object 104 such as the candidate upper surface 438 includes points within a threshold distance of a boundary of the field of view 404. For example, as shown in FIG. 4A, portions of the candidate upper surface 438 abut the upper boundary and the left boundary of the field of view 404. When the detected portion of the object 104 is too close to the boundary of the field of view 404, the determination at block 315 is negative. As will be understood, the above determination may indicate that the object 104 is too close to the sensor 132, and/or that the object 104 is not sufficiently centered within the field of view 404.

The threshold can be zero, indicating that the object 104 likely overflows the field of view 404. The threshold need not be zero, however, such that even if the entire object 104 is within the field of view 404, the determination at block 315 can be negative if the object 104 is not centered within the field of view 404.

When the determination at block 315 is negative, the device 100 proceeds to block 320. At block 320, the device 100 is configured to generate at least one positional feedback instruction, and to control the display 128 and/or another suitable output device to present the positional feedback instruction. The device 100 can store, e.g., as a component of the application 136, a plurality of predetermined positional feedback instructions, and at block 320 the processor 116 can select one or more of the positional feedback instructions for display based on the outcome of the determination(s) at block 315.

For example, as shown in FIG. 4B, the processor 116 can control the display 128 to present the point cloud 400 itself (and/or the IR image captured at block 305), as well as positional feedback instructions 412 and 416. The positional feedback instruction 412 instructs an operator of the device 100 to move the device 100 so as to reposition the field of view 404 further to the left relative to the object 104, because the object 104 intersects with the left boundary of the field of view 404. In the illustrated example, the positional feedback instruction 416, instructing the operator to move the device 100 so as to reposition the field of view 404 further upwards, is also presented because the object 104 intersects with the upper boundary of the field of view 404. As will be apparent, other positional feedback instructions can be stored at the device 100 and selected for presentation at block 320, including instructions to move the device 100 so as to reposition the field of view 404 to the right, and to reposition the field of view 404 downwards.

Figure 5A:
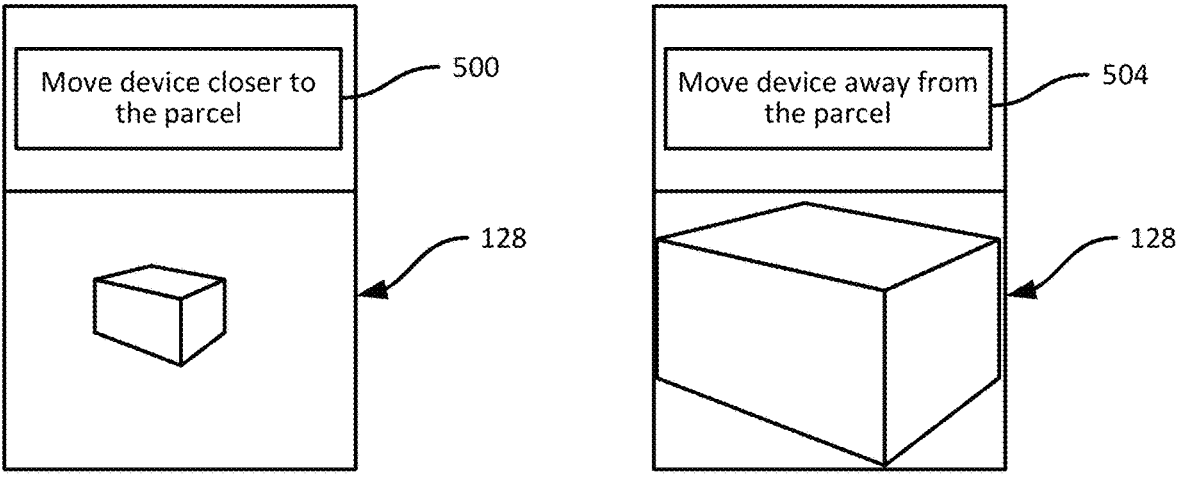
FIG. 5A is a diagram illustrating additional example performances of block 320 of the method of FIG. 3.

Turning to FIG. 5A, additional examples of positional feedback instructions are illustrated. For example, the device 100 can present an instruction 500, instructing the operator to bring the device 100 closer to the object 104, when the distance between the sensor 132 and the object 104 exceeds the upper threshold mentioned above. Conversely, the device 100 can present an instruction 504, instructing the operator to move the device 100 away from the object 104, when the distance between the sensor 132 and the object 104 is smaller than the lower threshold mentioned above. Following block 320, the device 100 returns to block 305.

Figure 5B:
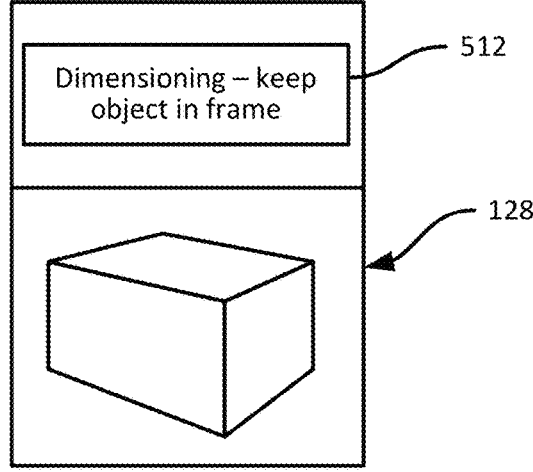
FIG. 5B is a diagram illustrating another example performance of block 320 of the method of FIG. 3.

The device 100 is therefore configured to repeat the capture of a point cloud and image, detection of the object 104, and determination of whether the detected object 104 meets the positional criteria set out above. The positional feedback presented on the display 128 can be dynamically updated with each successive performance of block 320, until the determination at block 315 is affirmative. When the determination at block 315 is affirmative, the first phase of assessment and feedback generation can be considered complete, and the device 100 advances to block 325. In addition, e.g., as shown in FIG. 5B, upon an affirmative determination at block 315, the processor 116 can control the display 128 to present a feedback element 512 informing the operator of the device 100 that dimensioning is in progress, and/or instructing the operator to maintain the current position of the device 100.

At block 325, the device 100 is configured to attempt to dimension the object 104. Dimensioning can include, for example, identifying the edges of the upper surface 138, and determining the length and width of the object 104 based on those edges. Dimensioning can also include determining a perpendicular distance between the upper surface 138 and the support surface 108.

At block 330, the device 100 is configured to determine whether dimensioning at block 325 was successful. The dimensioning process (e.g., a routine within the application 136, or a separate application called by the application 136) may, under some conditions, return an error instead of dimensions for the object 104, or may return dimensions along with a confidence level. If the dimensioning process returns an error or a confidence level below a threshold, the determination at block 330 is negative. Dimensioning at block 325 may fail for a variety of reasons. For example, if portions of the point cloud captured at the most recent performance of block 305 are empty or have low point density, edge detection for the upper surface 138 may fail. In other examples, materials incompatible with IR ToF-based dimensioning (e.g., black surfaces, highly reflective surfaces, bubble wrap, or the like) may lead to low point cloud density that impedes detection of object surfaces and edges. In further examples, multipath artifacts, e.g., in the form of portions of the object 104 being represented as curved in the point cloud, may lead to dimensioning failure.

More generally, even when the object 104 is located at a position relative to the sensor 132 that is amenable to dimensioning, as confirmed via blocks 310, 315, and 320, other factors may interfere with dimensioning the object 104. Through a second phase of assessment and feedback, the device 100 is configured to attempt to classify the reason for dimensioning failure, and present advanced feedback to the operator of the device 100. The advanced feedback is referred to as "advanced" rather than positional (although some advanced feedback may relate to positioning of the object 104 relative to the device 100) because the advanced feedback seeks to address dimensioning errors extending beyond those caused by incorrect positioning of the object 104 within the field of view 404.

When the determination at block 330 is affirmative, the device 100 is configured to output dimensions, and performance of the method 300 ends. When the determination at block 330 is negative, however, the device 100 proceeds to block 335. At block 335, the device 100 is configured to determine whether the counter initialized at block 305 has reached a predetermined threshold. The threshold is set at a number of frames (e.g., a number of performances of block 305 without a successful dimensioning, after an affirmative determination at block 315) beyond which to begin producing advanced feedback for the operator of the device 100. A wide variety of thresholds can be employed. In the present example, in which the performance of block 305 occurs at a frame rate of about 10 frames per second, the threshold can be set at a value of seven. The counter can be initialized at a value of zero, for example. At a first performance of block 335, the determination is negative, as the counter has not been incremented beyond its initial value. The device 100 therefore proceeds to block 340, at which the counter is incremented (e.g., from zero to one). The device 100 then returns to block 305.

If, following correct positioning of the object 104 in the field of view 404 (e.g., indicated by an affirmative determination at block 315), dimensioning at block 325 fails seven (or any other suitable number, depending on the counter threshold) consecutive times, the determination at block 335 is affirmative. The device 100 then proceeds to block 345. At block 345, the device 100 is configured to classify the dimensioning failure. That is, the device 100 is configured to detect one or more potential causes of the dimensioning failure.

The device 100 is then configured, at block 350, to select and present advanced feedback on the display 128 or other suitable output device, based on the detected cause(s) of the dimensioning failure from block 345. The device 100 is configured to repeat data capture and assessment, e.g., until dimensioning succeeds or a timeout period is reached (e.g., 10 seconds, although various other periods can be employed). When dimensioning succeeds, the device 100 proceeds from block 330 to block 355, and controls the display 128 or other output device to present the dimensions, e.g., overlaid on the point cloud and/or image from block 305.

Figure 6:
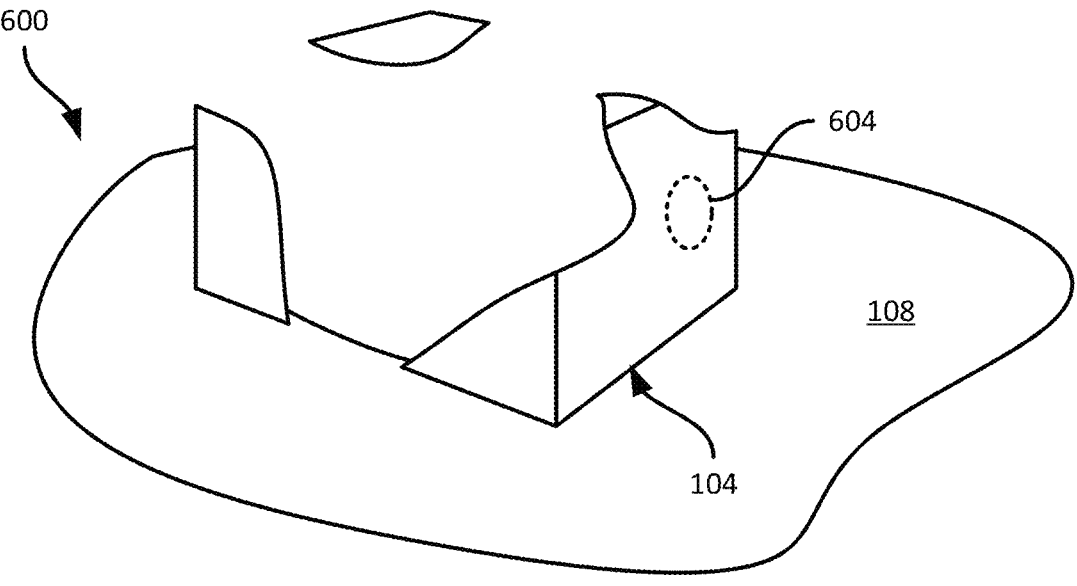
FIG. 6 is a diagram illustrating a point cloud and a two-dimensional image captured by the device of FIG. 1.
Figure 6:
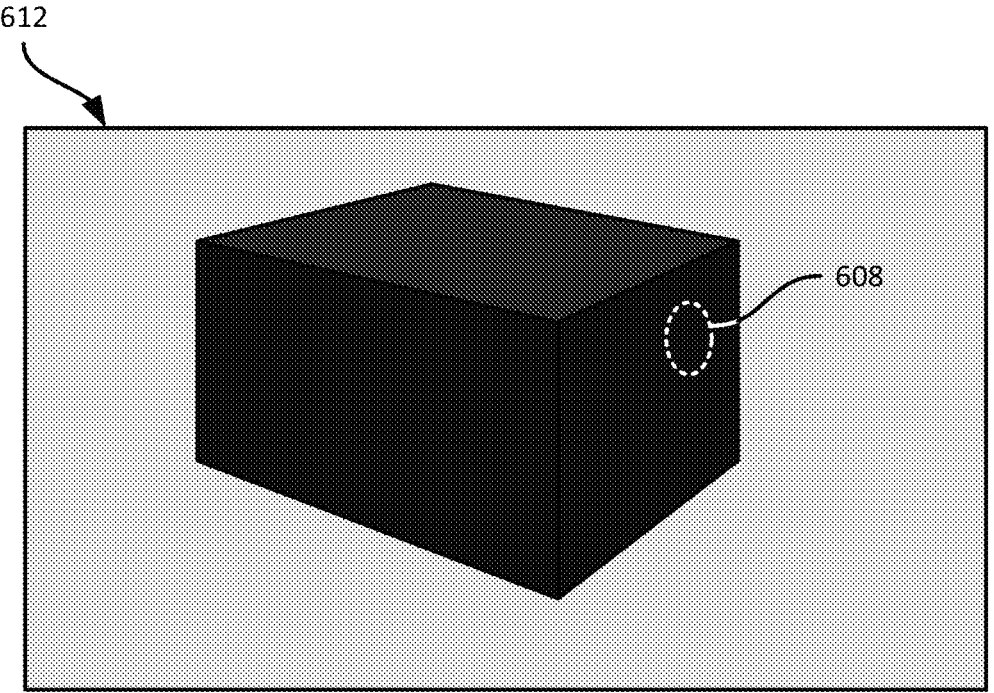

The device 100 can be configured to assess a variety of criteria at block 345. For example, turning to FIG. 6, the device 100 can be configured to determine whether an intensity of a top surface of the object 104 in the two-dimensional image exceeds a threshold. FIG. 6 illustrates an example point cloud 600, in which a significant portion of the object 104, including the majority of the upper surface 138, is not represented. That is, point density over the object 104 may be too low for dimensioning, or points may be missing entirely (that is, no depth measurements may have been generated at block 305 for some points). Some surface materials are prone to such underrepresentation in the point cloud 600, such as dark-colored or otherwise IR-absorbent materials.

The device 100 can therefore be configured to select a portion of the object 104 detected from the point cloud, e.g., a portion 604, and map the portion 604 to a portion 608 of an image 612 captured simultaneously with the point cloud 600. The device 100 can then be configured to determine an average intensity of the portion 608. The intensity of each pixel in the image 612 may be expressed as one of a range of numerical values, e.g., with a minimal value (e.g., zero) indicating low intensity (e.g., black), and a maximal value (e.g., 255) indicating high intensity (e.g., white). If the portion 608 has an intensity below a threshold, the surface material of the object 104 may be IR-absorbent, and therefore not suitable for dimensioning. The device 100 may therefore present advanced feedback on the display 128 indicating, for example, that the object 104 has an unsupported surface material, and should be dimensioned via a different mechanism than the sensor 132. An example feedback instruction 700 is shown in FIG. 7A.

Other intensity-based assessments can include determining whether a region of the object 104 has an intensity greater than an upper threshold indicative of glare on the object 104. In some cases, the device 100 may be a suitable distance away from the object as assessed at block 315, but if the object is reflective the light emitted by the sensor 132 may nevertheless result in high-intensity reflections the object that introduce errors to the point cloud. When regions of high intensity are detected in the image, at block 350 the device 100 can present feedback instructing the operator to increase the angle between the device 100 and the upper surface 138 (e.g., by tilting the device away from horizontal), and/or to move the device 100 further away from the object 104, as shown in FIG. 7B.

In other examples, at block 345 the device 100 can determine whether a surface material of the object 104 is incompatible with dimensioning via the sensor 132 by comparing a plane fitting error for the upper surface 138 with a threshold. For example, some materials, such as translucent bubble wrap or the like, may generate numerous reflections at various heights over the area of the upper surface 138. The plane(s) fitted to the upper surface 138 from the point cloud may therefore exhibit high levels of error, e.g., expressed as root mean square (RMS) or other suitable indicators. When an error associated with a plane fitted to the upper surface 138 exceeds a predetermined threshold, the device 100 can be configured to present feedback indicating that the object 104 has an unsupported surface material, and should be dimensioned via a different mechanism than the sensor 132.

In further examples, the device 100 can determine whether a sufficient area of the support surface 108 is visible in the point cloud. For example, the absence of a horizontal support surface, or the visibility of only a small area of a horizontal support surface, can result in dimensioning failure. At block 345, the device 100 can therefore determine whether the support surface 108 was detected at block 310. When no support surface was detected, the device 100 can proceed to block 350 and present a feedback instruction indicating that the object 104 should be placed on a larger support surface and/or a horizontal support surface, as shown in FIG. 7C.

In further examples, the device 100 can be configured to determine whether the point cloud from block 305 contains multipath artifacts, e.g., by determining whether the upper surface 138 as detected in the point cloud is curved. Such artifacts can result from nearby surfaces that generate additional reflections impacting the sensor 132. In response to detecting possible multipath artifacts, the device 100 can present feedback instructing the operator to move the object 104 away from other nearby objects, as shown in FIG. 7D.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a computing device, the method comprising:

capturing, via a depth sensor having a field of view, (i) a point cloud depicting an object resting on a support surface, and (ii) a two-dimensional image depicting the object and the support surface;

based on the point cloud, detecting a portion of the object;

determining, based on the portion of the object, whether a position of the object within the field of view meets a positional criterion;

when the position of the object within the field of view does not meet the positional criterion, generating a positional feedback instruction, controlling a display to present the positional feedback instruction;

initializing a counter;

responsive to presenting the positional feedback instruction, capturing (i) a further point cloud depicting the object resting on the support surface, and (ii) a further two-dimensional image depicting the object and the support surface;

attempting to dimension the object based on the further point cloud; and when the dimensioning attempt fails, incrementing the counter and repeating the capturing and the attempting to dimension.

2. The method of claim 1, wherein determining whether the position of the portion of the object within the field of view meets the positional criterion includes:

determining a distance from the depth sensor to the portion of the object;

determining at least one of (i) whether the distance exceeds a lower threshold, or (ii) whether the distance is smaller than an upper threshold.

3. The method of claim 2, wherein the positional feedback instruction includes:

when the distance does not exceed the lower threshold, an instruction to move the depth sensor away from the object; and when the distance exceeds the upper threshold, an instruction to move the depth sensor towards the object.

4. The method of claim 1, wherein determining whether the position of the portion of the object within the field of view meets the positional criterion includes determining whether the portion of the object is within a threshold distance of a boundary of the field of view; and wherein the positional feedback instruction includes an instruction to reposition the depth sensor to shift the field of view in the direction of the boundary.

5. The method of claim 1, further comprising: when the counter reaches a threshold, determining a likely cause of dimensioning failure based on at least one of the further point cloud and the further image; and controlling the display to present an advanced feedback instruction.

6. The method of claim 5, wherein determining the likely cause includes at least one of:

determining whether an intensity of a top surface of the object in the image exceeds an upper threshold;

determining whether the intensity of the top surface in the image is below a lower threshold;

determining, based on the point cloud, whether a plane fitting error associated with the top surface exceeds a threshold; and determining whether a sufficient area of the support surface is represented in the point cloud.

7. The method of claim 1, wherein the advanced feedback instruction includes at least one of:

an instruction to change an angle of the depth sensor relative to the top surface;

an indication that a surface material of the object is incompatible with the depth sensor; and an instruction to check for sufficient support surface area surrounding the object in the field of view.

8. A computing device, comprising:

a depth sensor; and a processor configured to:

capture, via a depth sensor having a field of view, (i) a point cloud depicting an object resting on a support surface, and (ii) a two-dimensional image depicting the object and the support surface;

based on the point cloud, detect a portion of the object;

determine, based on the portion of the object, whether a position of the object within the field of view meets a positional criterion;

when the position of the object within the field of view does not meet the positional criterion, generate a positional feedback instruction, and control a display to present the positional feedback instruction;

initialize a counter;

responsive to presenting the positional feedback instruction, capture (i) a further point cloud depicting the object resting on the support surface, and (ii) a further two-dimensional image depicting the object and the support surface;

attempt to dimension the object based on the further point cloud; and when the dimensioning attempt fails, increment the counter and repeating the capturing and the attempting to dimension.

9. The computing device of claim 8, wherein the processor is configured to determine whether the position of the portion of the object within the field of view meets the positional criterion by:

determining a distance from the depth sensor to the portion of the object;

determining at least one of (i) whether the distance exceeds a lower threshold, or (ii) whether the distance is smaller than an upper threshold.

10. The computing device of claim 9, wherein the positional feedback instruction includes:

when the distance does not exceed the lower threshold, an instruction to move the depth sensor away from the object; and when the distance exceeds the upper threshold, an instruction to move the depth sensor towards the object.

11. The computing device of claim 8, wherein the processor is configured to determine whether the position of the portion of the object within the field of view meets the positional criterion by determining whether the portion of the object is within a threshold distance of a boundary of the field of view; and wherein the positional feedback instruction includes an instruction to reposition the depth sensor to shift the field of view in the direction of the boundary.

12. The computing device of claim 8, wherein the processor is further configured to: when the counter reaches a threshold, determine a likely cause of dimensioning failure based on at least one of the further point cloud and the further image; and control the display to present an advanced feedback instruction.

13. The computing device of claim 12, wherein the processor is configured to determine the likely cause by at least one of:

determining whether an intensity of a top surface of the object in the image exceeds an upper threshold;

determining whether the intensity of the top surface in the image is below a lower threshold;

determining, based on the point cloud, whether a plane fitting error associated with the top surface exceeds a threshold; and determining whether a sufficient area of the support surface is represented in the point cloud.

14. The computing device of claim 8, wherein the advanced feedback instruction includes at least one of:

an instruction to change an angle of the depth sensor relative to the top surface;

an indication that a surface material of the object is incompatible with the depth sensor; and an instruction to check for sufficient support surface area surrounding the object in the field of view.

* * * * *